(12) United States Patent
Hitters et al.

(10) Patent No.: US 7,169,320 B2
(45) Date of Patent: Jan. 30, 2007

(54) PENTAFLUOROPROPANE-BASED COMPOSITIONS

(75) Inventors: Guillermo J. Hitters, Hamburg, NJ (US); Kane D. Cook, Eggertsville, NY (US); Gary M. Knopeck, Lakeview, NY (US); Hang T. Pham, Amherst, NY (US); Ian R. Shankland, Randolph, NJ (US); Rajiv R. Singh, Getzville, NY (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 11/077,928

(22) Filed: Mar. 11, 2005

(65) Prior Publication Data

US 2005/0205832 A1 Sep. 22, 2005

Related U.S. Application Data

(62) Division of application No. 10/321,193, filed on Dec. 17, 2002, now Pat. No. 6,896,823.

(60) Provisional application No. 60/342,067, filed on Dec. 18, 2001.

(51) Int. Cl.
*C09K 5/04* (2006.01)
(52) U.S. Cl. .............. 252/67; 521/72; 264/53
(58) Field of Classification Search ............ None
See application file for complete search history.

(56) References Cited

U.S. PATENT DOCUMENTS

| | | | | |
|---|---|---|---|---|
| 2,834,748 A | 5/1958 | Bailey et al. | | 260/42 |
| 2,846,458 A | 8/1958 | Haluska | | 260/448.2 |
| 2,917,480 A | 12/1959 | Bailey et al. | | 260/42 |
| 5,064,560 A | 11/1991 | Merchant | | 252/171 |
| 6,296,981 B1 * | 10/2001 | Swan | | 430/124 |
| 6,852,684 B1 * | 2/2005 | Westbrook et al. | | 510/410 |

FOREIGN PATENT DOCUMENTS

| | | |
|---|---|---|
| EP | 0952177 | 12/1997 |
| WO | WO 99/60052 | 11/1999 |
| WO | PCT/US02/40482 | 12/2002 |

OTHER PUBLICATIONS

Saunders and Frisch, "Polyurethanes Chemistry and Technology, vol. I", Part I, John Wiley and Sons, 1962, 219-223.
Saunders and Frisch, "Polyurethanes Chemistry and Technology, vol. I", Part II, John Wiley and Sons, 1962, 193-201.
Prausnitz, Lichtenthaler, Azevedo, "Molecular Thermodynamics of Fluid-Phase Equilibria", Prentice-Hall, Inc. (second edition), pp. 279-290.
Barton, "CRC Handbook of Solubility Parameters and Other Cohesion Parameters", CRC Press, Inc. (Fourth Printing 1988), pp. 27-35.
Acree, Jr., "Thermodynamic Properties of Nonelectrolyte Solutions", Academic Press (1984) 90-97, 180-189.

* cited by examiner

*Primary Examiner*—John R. Hardee
(74) *Attorney, Agent, or Firm*—Erika S. Wilson

(57) ABSTRACT

The present invention provides compositions comprising pentafluoropropane, a second component selected from the group consisting of decafluoropropane, perfluorobutyl methyl ether and combinations of these, and a third component selected from the group consisting of methanol, 1,2-trans-dichloroethylene and combinations of these. The present invention further provides for refrigerants, blowing agents, foam compositions, polyol premixes, closed-cell foams, sprayable compositions, and the like, comprising the present compositions.

22 Claims, No Drawings

PENTAFLUOROPROPANE-BASED COMPOSITIONS

CROSS REFERENCE TO RELATED APPLICATIONS

This application is a divisional of and claims priority to U.S. Pat. No. 6,896,823 issued on May 24, 2005, and having a filing date of Dec. 17, 2002, which in turn claims priority to provisional application U.S. Ser. No. 60/342,067, having a filing date of Dec. 18, 2001. Each of these applications are included herein by reference.

FIELD OF INVENTION

The present invention relates generally to compositions of pentafluoropropane. More specifically, the present invention provides for compositions comprising pentafluoropropane that have a relatively constant boiling point, and uses thereof.

BACKGROUND

Hydrofluorocarbon-based compositions are of interest for use as replacements for chlorofluorocarbon ("CFC") and/or hydrochlorofluorocarbon ("HCFC") compositions, which tend to be environmentally undesirable. In particular, applicants have recognized that compositions comprising mixtures of hydrofluorocarbon ("HFC") and non-HFC fluids are of interest for use in a wide range of applications, including for use as propellants in aerosol or other sprayable compositions. Unfortunately, applicants have further identified a number of disadvantages associated with adapting typical HFC/non-HFC mixtures for use in aerosols.

One disadvantage associated with the use of typical HFC/non-HFC mixtures in aerosols is that different HFC/non-HFC mixtures, including those which comprise the same components but differ, even slightly in the relative concentrations thereof, tend to form sprayable products having vastly different properties. For example, an important property of aerosols and other pressurized, sprayable products is the nature of the spray itself. Sprays may be characterized, for example, as "mists" versus "streams" or as "dry" versus "wet". The spray characteristics of an aerosol are determined by several factors but one of the most important is pressure. It is well known in the art that changes in the pressure of an aerosol or other sprayable product can significantly alter spray properties. For example, higher pressures will generally yield more mist-like sprays while lower pressures will yield more stream-like sprays. The pressure of a typical aerosol is a function of the amount and type of propellant in the formulation and the amount and type of solvent or solvents in the formulation. The incorporation of a higher-boiling, hence lower-pressure, solvent into a formulation will tend to lower the pressure of the finished product while the incorporation of a lower-boiling, hence higher-pressure, solvent will tend to raise the pressure of the finished product.

Unfortunately, as is known in the art, HFC/non-HFC mixtures tend to undergo a significant change in boiling point for a relatively small change in the relative concentrations of the HFC/non-HFC constituents in the mixture. Consequently, slightly different HFC/non-HFC mixtures result in sprayable compositions having significantly different spray characteristics. Thus, even where one particular combination of two or more HFC/non-HFC solvents is deemed suitable for use in a given spray application, other combinations of the same two or more HFC/non-HFC solvents, which differ only slightly in the relative concentrations of the HFC/non-HFC solvents, may be unsuitable for the same application.

Applicants have come to appreciate that mixtures of two or more HFC and non-HFC solvents having relatively constant boiling points and vapor pressures, that is, boiling points and vapor pressures that change by a relatively small degree as the relative concentration of the mixture constituents changes, are desirable. In the manufacture of such mixtures, the relatively constant boiling point/vapor pressures would allow a wider range of compositions to be used for a given spray application. Unfortunately, HFC/non-HFC mixtures having such relatively constant boiling point and vapor pressure properties are not only uncommon, but also unpredictable.

DETAILED DESCRIPTION OF THE INVENTION AND PREFERRED EMBODIMENTS

The present invention overcomes the aforementioned shortcomings by providing for HFC compositions that exhibit relatively constant boiling point and vapor pressure characteristics. Specifically, the applicants have identified relatively-constant-boiling-point compositions comprising 1,1,1,3,3-pentafluoropropane ("HFC-245fa"), a second component selected from the group consisting of 1,1,1,2,2,3,4,5,5,5-decafluoropentane ("HFC-4310"), perfluorobutyl methyl ether ("HFE-449") and combinations of these, and a third component selected from the group consisting of methanol, 1,2-trans-dichloroethylene ("Trans") and combinations of these.

As used herein, the term "relatively-constant-boiling-point composition" (or "RCPB composition" for short) refers to a composition comprising two or more constituents and having a boiling point which (1) lies between the highest and lowest boiling points of the individual constituents, and (2) changes less than one would expect for a given change in relative concentration of the constituents. With respect to the first boiling point characteristic, since the boiling point of the composition is between the highest and the lowest boiling point of its individual constituents, it is not an azeotrope. (It should be understood that a composition which is not an azeotrope may still be azeotrope-like.) As a non-azeotrope composition, the RCBP composition of the present invention, during boiling, undergoes a change in the relative concentration of the constituents as the more volatile components of the composition are vaporized. With respect to the second boiling point characteristic, while the boiling points of azeotrope compositions are by their very nature unpredictable, conventional wisdom suggests that the boiling point of a non-azeotropic composition can be predicted based on the boiling points of the constiuents and their relative concentration in the composition. The applicants have discovered unexpectedly, however, that for a given change in the relative concentration of the constiutents, RCBP compositions exhibit a boiling point change less than would be expected using known predictive techniques.

For most conventional non-azeotropic compositions, those of skill in the art can calculate an expected change in boiling point by using one of a number of known techniques. Perhaps the most common approach is by using the Regular Solution Model (as illustrated in Prausnitz, Lichtenthaler, Azevedo "Molecular Thermodynamics of Fluid-Phase Equilibria", Prentice-Hall, Inc. (second edition), pp. 279–290 and Barton, "CRC Handbook of Solubility Parameters and Other Cohesion Parameters", CRC Press, Inc. (Fourth Printing 1988), pp. 27–35, both of which are incorporated herein by reference). Another common approach to predicting the expected boiling point curve for a range of compositions is by using the Wilson Model (illustrated in Acree, Jr., "Thermodynamic Properties of Nonelectrolyte Solutions", Academic Press (1984) 90–97, 180–189, which is incorporated by reference). For purposes of explanation and simplicity, any reference herein to "expected" boiling points, changes therein, or data therefor can be assumed to be calculated using the Regular Solution Model or the Wilson Model unless otherwise stated.

The Regular Solution Model is used conventionally to predict the boiling point curve for a "regular solution" composition as the relative concentration of the constituents (e.g. constituents A and B) change. By inputting characteristic data specific to the pure compositions of A and B, the Regular Solution Model equations provide a relatively quick method for predicting the expected boiling points for a composition having varying relative concentrations of constituents A and B—that is, the boiling points for the composition comprising from 100 wt. % A/0 wt. % B to 0 wt. % A/100 wt. % B. (All weight percents reported herein are based on total weight of the composition unless otherwise specified.) As is generally expected, the boiling point curve of a range of compositions that act as a regular solution tends to have a significantly positive slope, indicating that the compositions across that range will exhibit significant liquid compositional changes upon boiling or evaporation. Upon measuring experimentally and plotting the actual boiling curve for a composition having varying relative concentrations of constituents A and B, where the experimental data substantially corresponds to the predicted curve, the compositions are "regular solutions". However, where a composition exhibits an actual boiling point curve that deviates from the regular solution model via a less positive slope (a flatter slope or a slope closer to zero), the composition within that range will tend to exhibit relatively less significant, and often only minor, changes in boiling points as the relative concentration of the constituents changes. Such compositions comprise relatively-constant-boiling-point compositions according to the present invention.

The Wilson Model is a mathematical model used conventionally to predict the boiling points for a composition having varying relative concentrations of constituents A and B, that may or may not behave as a regular solution. The Wilson Model differs, at least in part, from the Regular Solution Model in that the Wilson Model allows the user to input not only the characteristic data of pure A and pure B components, but also, any characteristic data already known or measured for mixtures of A and B. Thus, where a user is provided with, or is otherwise aware of, characteristic data associated with some of the mixtures of A and B having relative concentrations of constituents A and B between pure A and pure B, such data can be incorporated into the Wilson Model, along with the data associated with pure A and pure B, to afford an approximation of the boiling point for any composition having varying relative concentrations of constituents A and B. Because the Wilson Model allows for the incorporation of more known data points than the Regular Solution Model, the curves predicted by Wilson tend to be closer to the actual measured curve than the Regular Solution Model. Accordingly, upon measuring experimentally and plotting the boiling points of the mixtures of A and B, those of skill in the art would expect the resulting graph to resemble, and have a slope similar to, a graph of the boiling points predicted by the Wilson Model. However, applicants have discovered that certain compositions exhibit an actual boiling point curve that deviates even from the Wilson Model via a less positive slope (a flatter slope or a slope closer to zero) then would be expected. Such compositions comprise RCPB compositions for the purposes of the present invention.

Applicants have come to appreciate unexpectedly that the HFC-245fa-based compositions of the present invention comprise RCBP compositions. Specifically, applicants have determined that the experimentally measured boiling point curve for the compositions of the present invention has a slope which is unexpectedly and significantly flatter than the slope of the boiling point curves predicted using either the Regular Solution Model or the Wilson Model as described above.

By way of example, applicants have evaluated the boiling points and boiling point slopes of compositions of the present invention by providing mixtures of HFC-245fa and a second component selected from HFC-4310, HFE-449, and mixtures thereof, and adding small amounts of a third component selected from methanol, Trans, and mixtures thereof, to the provided mixture. After each addition of third component, the boiling point of the composition was measured. A plot of the measured boiling point temperature (y-axis) as a function of the weight percent of third component in the composition (x-axis) gives a plot having a slope which is significantly flatter than the slope of the predicted plot.

According to certain preferred embodiments, the slope of the boiling point curve for compositions of the present invention is about 1.25 degree per 10 wt. % of third component, or less. Preferably, the slope is about 1 degree per 10 wt. % of third component, or less, more preferably about 0.8 degree per 10 wt. % of third component, or less, even more preferably about 0.7 degree per 10 wt. % of third component, or less, and still even more preferably about 0.6 degree per 10 wt. % of third component, or less.

In preferred embodiments, the boiling point for compositions of the present invention is relatively constant. According to certain preferred embodiments, the compositions of the present invention have a boiling point of about 22° C.±7° C. at 14.7 psia, more preferably about 23° C.±5° C. at 14.7 psia, even more preferably about 23° C.±4° C. at 14.7 psia, and in certain even more preferred embodiments, 23° C.±3° C. at 14.7 psia. In certain other preferred embodiments, the compositions of the present invention have a boiling point of 20° C.±5° C. at 14.7 psia.

The compositions of the present invention comprise, and, according to certain preferred embodiments, consist essentially of, HFC-245fa, a second component selected from the group consisting of HFC-4310, HFE-449, and combinations of these, and a third component selected from the group consisting of methanol, Trans, and combinations of these.

Pentafluoropropane/decafluoropropane/methanol

One embodiment of the present invention provides compositions comprising, and preferably consisting essentially of, HFC-245fa, HFC-4310, and methanol. Preferably, these embodiments provide compositions comprising, and preferably consisting essentially of, from about 37 to about 75 weight percent HFC-245fa, from about 3 to about 60 weight percent HFC-4310, and from about 1 to about 60 weight percent methanol.

The preferred, more preferred, and most preferred compositions of this embodiment are set forth in Table 1. The numerical ranges in Table 1 are to be understood to be prefaced by the term "about".

TABLE 1

| Components | Preferred (pbw) | More Preferred (pbw) | Most Preferred (pbw) |
| --- | --- | --- | --- |
| HFC-245fa | 37–75 | 40–70 | 40–65 |
| HFC-4310 | 60–3 | 10–50 | 20–40 |
| Methanol | 60–1 | 5–50 | 10–40 |

Pentafluoropropane/decafluoropropane/1,2-trans-dichloroethylene

Another embodiment of the present invention provides compositions comprising, and preferably consisting essentially of, HFC-245fa, HFC-4310, and Trans. Preferably, these embodiments provide compositions comprising, and preferably consisting essentially of, from about 25 to about 75 weight percent HFC-245fa, from about 15 to about 60 weight percent HFC-4310, and from about 1 to about 60 weight percent Trans.

The preferred, more preferred, and most preferred compositions of this embodiment are set forth in Table 2. The numerical ranges in Table 2 are to be understood to be prefaced by the term "about".

TABLE 2

| Components | Preferred (pbw) | More Preferred (pbw) | Most Preferred (pbw) |
| --- | --- | --- | --- |
| HFC-245fa | 25–75 | 25–70 | 25–65 |
| HFC-4310 | 60–15 | 25–50 | 35–45 |
| 1,2-Trans-dichloroethylene | 60–1 | 5–50 | 10–40 |

Pentafluoropropane/Perfluorobutyl methyl ether/methanol

Another embodiment of the present invention provides compositions comprising, and preferably consisting essentially of, HFC-245fa, HFE-449, and methanol. Preferably, these embodiments provide compositions comprising, and preferably consisting essentially of, from about 37 to about 75 weight percent HFC-245fa, from about 3 to about 60 weight percent HFE-449, and from about 1 to about 60 weight percent methanol.

The preferred, more preferred, and most preferred compositions of this embodiment are set forth in Table 3. The numerical ranges in Table 3 are to be understood to be prefaced by the term "about".

TABLE 3

| Components | Preferred (pbw) | More Preferred (pbw) | Most Preferred (pbw) |
| --- | --- | --- | --- |
| HFC-245fa | 37–75 | 40–70 | 40–65 |
| HFE-449 | 60–3 | 10–50 | 20–40 |
| Methanol | 60–1 | 5–50 | 10–40 |

Pentafluoropropane/Perfluorobutyl methyl ether/1,2-trans-dichloroethylene

Another embodiment of the present invention provides compositions comprising, and preferably consisting essentially of, pentafluoropropane, preferably HFC-245fa, HFE-449, and Trans. Preferably, these embodiments provide compositions comprising, and preferably consisting essentially of, from about 25 to about 75 weight percent HFC-245fa, from about 15 to about 60 weight percent HFE-449, and from about 1 to about 60 weight percent Trans.

The preferred, more preferred, and most preferred compositions of this embodiment are set forth in Table 4. The numerical ranges in Table 4 are to be understood to be prefaced by the term "about".

TABLE 4

| Components | Preferred (pbw) | More Preferred (pbw) | Most Preferred (pbw) |
| --- | --- | --- | --- |
| HFC-245fa | 25–75 | 25–70 | 25–65 |
| HFE-449 | 60–15 | 25–50 | 35–45 |
| 1,2-Trans-dichloroethylene | 60–1 | 5–50 | 10–40 |

Uses of the Compositions

The present compositions have utility in a wide range of applications. For example, one embodiment of the present invention relates to the use of the present compositions as propellants/solvents in sprayable compositions. In general, sprayable-type compositions comprise a material to be sprayed and a propellant/solvent or mixture of propellant solvents. For the sprayable compositions to be useful, it is necessary that the material to be sprayed be relatively or substantially soluble in the propellant/solvents to be used. While many HFCs alone, such as HFC-245fa, tend to be poor solvents, applicants have recognized that the compositions of the present invention exhibit relatively high solubility, while also remaining non-flammable.

Any of a wide range of sprayable materials can be used in conjunction with the compositions of the present invention to produce a sprayable composition. Examples of suitable materials include, without limitation, oils and other lubricants, such as mineral oil, release agents such as silicone oils (polydimethylsiloxanes), coatings, such as acrylics, cleaners, polishing agents, medicinal materials, such as, anti-asthma and anti-halitosis medicines, as well as, cosmetic materials, such as, deodorants, perfumes, hair sprays, and the like.

The sprayable compositions of the present invention may further comprise any of a wide range of inert ingredients, additional solvents, and other materials used conventionally in sprayable compositions.

In still other embodiments, the present invention provides foamable compositions, and preferably polyurethane and polyisocyanurate foam compositions, and methods of preparing foams. In such foam embodiments, at least one of the present compositions are included as a blowing agent in a foamable composition. This composition preferably includes one or more additional components capable of reacting and foaming under the proper conditions to form a foam or cellular structure as is well known in the art.

The present invention also provides for a method of preparing a foamable composition. Any of the methods well known in the art, such as those described in "Polyurethanes Chemistry and Technology," Volumes I and II, Saunders and Frisch, 1962, John Wiley and Sons, New York, N.Y., which is incorporated herein by reference, may be used or adapted for use in accordance with the foam embodiments of the present invention. In general, such methods comprise preparing polyurethane or polyisocyanurate foams by combining an isocyanate, a polyol or mixture of polyols, a blowing agent or mixture of blowing agents comprising one or more of the present compositions, and other materials such as catalysts, surfactants, and optionally, flame retardants, colorants, or other additives. It is convenient in many applications to provide the components for polyurethane or polyisocyanurate foams in pre-blended formulations. Most typically, the foam formulation is pre-blended into two components. The isocyanate and optionally certain surfactants and blowing agents comprise the first component, commonly referred to as the "A" component. The polyol or polyol mixture, surfactant, catalysts, blowing agents, flame retardant, and other isocyanate reactive components comprise the second component, commonly referred to as the "B" component. Accordingly, polyurethane or polyisocyanurate foams are readily prepared by bringing together the A and B side components either by hand mix for small preparations or by machine mix techniques for larger formulations to form blocks, slabs, laminates, pour-in-place panels and other items, spray applied foams, froths, and the like. Optionally, other ingredients such as fire retardants, colorants, auxiliary blowing agents, and even other polyols can be added as a third stream to the mix head or reaction site. Most conveniently, however, they are all incorporated into one B-component as described above.

The invention also relates to foam, and preferably closed cell foam, prepared from a polymer foam formulation containing a blowing agent comprising the composition of the invention.

In other embodiments, the compositions of the present invention are used as refrigerants in any of a wide variety of refrigeration systems. In certain preferred embodiments, the compositions of the present invention may be used in refrigeration systems containing a lubricant used conventionally with CFC-refrigerants, such as mineral oils, silicone oils, and the like. While HFC-containing refrigerants tend to be poorly soluble with conventional refrigeration lubricants, and therefore tend to be incompatible with such lubricants, applicants have recognized that the relative solubility of the present compositions makes them suitable, and in some cases, ideal candidates for use with conventional lubricants. In addition, the relatively constant boiling nature of the compositions of the present invention makes them even more desirable for use as refrigerants in many applications.

Additional components may be added to tailor the properties of the compositions of the invention as needed. By way of example, oil solubility aids may be added in the case in which the compositions of the invention are used as refrigerants. Stabilizers and other materials may also be added to enhance the properties of the compositions of the invention.

EXAMPLES

The present invention is further illustrated by the following, non-limiting Examples.

Example 1

Four samples (A, B, C, and D) comprising HFC-245fa and HFC-4310 in the amounts shown in Table 5 are prepared and each sample is separately charged into an ebulliometer consisting of a vacuum-jacketed tube having a condenser on top. Methanol is added to each sample in small, measured increments. The temperature of each sample is recorded as a function of the methanol added. When sufficient methanol is added to a sample such that the resulting ternary compositions are within the ranges of the present invention, the boiling points of the compositions stay in the range of about 22° C. plus or minus 7° C., and more specifically in the range of about 20° C. plus or minus 5° C. Table 6 shows the various ternary mixtures tested and the boiling points measured therefor.

TABLE 5

|  | Sample | | | |
|---|---|---|---|---|
|  | A | B | C | D |
| Wt. % HFC-245 | 95 | 90 | 60 | 40 |
| Wt. % HFC-4310 | 5 | 10 | 40 | 60 |

TABLE 6

| wt % 245fa | wt % 4310 | wt % MeOH | Boiling Pt., ° C. |
|---|---|---|---|
| 95.0 | 5.0 | 0.0 | 15.2 |
| 92.8 | 4.9 | 2.3 | 15.0 |
| 91.2 | 4.8 | 4.0 | 15.1 |
| 85.8 | 4.5 | 9.7 | 15.7 |
| 76.4 | 4.0 | 19.6 | 15.6 |
| 65.7 | 3.5 | 30.8 | 15.8 |
| 56.4 | 3.0 | 40.6 | 16.5 |
| 47.1 | 2.5 | 50.4 | 21.3 |
| 36.1 | 1.9 | 62.0 | 22.6 |
| 90.0 | 10.0 | 0.0 | 17.7 |
| 87.5 | 9.7 | 2.8 | 17.5 |
| 86.0 | 9.6 | 4.4 | 17.8 |
| 80.7 | 9.0 | 10.3 | 18.1 |
| 71.8 | 8.0 | 20.2 | 18.2 |
| 62.6 | 7.0 | 30.4 | 18.4 |
| 54.0 | 6.0 | 40.0 | 19.3 |
| 44.7 | 5.0 | 50.3 | 23.8 |
| 60.0 | 40.0 | 0.0 | 18.4 |
| 58.7 | 39.1 | 2.2 | 18.1 |
| 57.1 | 38.1 | 4.8 | 17.9 |
| 53.9 | 36.0 | 10.1 | 17.8 |
| 47.9 | 32.0 | 20.1 | 20.7 |
| 42.2 | 28.2 | 29.6 | 20.7 |
| 36.0 | 24.0 | 40.0 | 21.0 |
| 29.6 | 19.8 | 50.6 | 22.1 |
| 26.7 | 17.8 | 55.5 | 26.0 |
| 25.9 | 17.3 | 56.8 | 29.2 |
| 40.0 | 60.0 | 0.0 | 23.2 |
| 58.7 | 39.2 | 2.1 | 23.2 |
| 57.2 | 38.2 | 4.6 | 22.8 |
| 54.4 | 36.3 | 9.3 | 22.7 |
| 48.3 | 32.2 | 19.5 | 24.6 |
| 41.0 | 27.3 | 31.7 | 24.7 |
| 35.7 | 23.8 | 40.5 | 25.2 |
| 29.9 | 20.0 | 50.1 | 24.9 |
| 28.7 | 19.1 | 52.2 | 25.0 |

Example 2

Each of four samples (A, B, C, and D as prepared in Example 1) is separately charged into an ebulliometer consisting of a vacuum-jacketed tube having a condenser on top. 1,2-Trans-dichloroethylene is added to each sample in small, measured increments. The temperature of each sample is recorded as a function of the Trans added. When sufficient Trans is added to a sample such that the resulting ternary compositions are within the ranges of the present invention, the boiling points of the compositions stay in the range of about 23° C. plus or minus 5° C., and more specifically between about 18 and about 25° C. Table 7 shows the various ternary mixtures tested and the boiling points measured therefor.

TABLE 7

| wt % 245fa | wt % 4310 | wt % trans | Boiling Pt., C. |
|---|---|---|---|
| 95.0 | 5.0 | 0 | 15.2 |
| 94.1 | 5.0 | 0.9 | 15.9 |

TABLE 7-continued

| wt % 245fa | wt % 4310 | wt % trans | Boiling Pt., C. |
|---|---|---|---|
| 93.2 | 4.9 | 1.9 | 14.9 |
| 92.3 | 4.9 | 2.8 | 14.8 |
| 90.7 | 4.8 | 4.5 | 14.8 |
| 85.3 | 4.5 | 10.2 | 14.7 |
| 75.7 | 4.0 | 20.3 | 14.9 |
| 65.8 | 3.5 | 30.7 | 15.2 |
| 56.2 | 3.0 | 40.8 | 15.5 |
| 46.8 | 2.5 | 50.7 | 15.8 |
| 38.9 | 2.0 | 59.1 | 16.2 |
| 90 | 10 | 0 | 17.2 |
| 89.2 | 9.9 | 0.9 | 17.2 |
| 88.4 | 9.8 | 1.8 | 17.1 |
| 85.3 | 9.5 | 5.2 | 17 |
| 81.1 | 9.0 | 9.9 | 17 |
| 72.2 | 8.0 | 19.8 | 17.4 |
| 63.8 | 7.1 | 29.1 | 17.8 |
| 54.0 | 6.0 | 40 | 18 |
| 44.3 | 4.9 | 50.8 | 18.4 |
| 34.4 | 3.8 | 61.8 | 19.4 |
| 60 | 40 | 0 | 19.1 |
| 58.4 | 39.0 | 2.6 | 18.7 |
| 56.0 | 37.4 | 6.6 | 18.6 |
| 53.6 | 35.8 | 10.6 | 18.6 |
| 48.0 | 32.0 | 20 | 18.9 |
| 41.8 | 27.8 | 30.4 | 19.4 |
| 35.6 | 23.7 | 40.7 | 20.2 |
| 29.9 | 20.0 | 50.1 | 20.6 |
| 25.8 | 17.2 | 57 | 21.1 |
| 40 | 60 | 0 | 22.3 |
| 39.0 | 58.5 | 2.5 | 22.2 |
| 37.1 | 55.7 | 7.2 | 21.9 |
| 35.7 | 53.6 | 10.7 | 21.9 |
| 32.0 | 48.1 | 19.9 | 22.2 |
| 28.2 | 42.2 | 29.6 | 22.7 |
| 24.2 | 36.3 | 39.5 | 22.9 |
| 19.8 | 29.7 | 50.5 | 23.8 |
| 15.6 | 23.3 | 61.1 | 25.2 |

Example 3

An ebulliometer consisting of a vacuum-jacketed tube having a condenser on top is charged with about 5 grams of a 5 wt % E-449/95 wt % HFC-245fa mixture. Methanol is added to the mixture in small, measured increments. The temperature is recorded as a function of the methanol added. When sufficient methanol is added such that the entire mixture comprises from about 35 to about 60 weight percent of methanol, the boiling point of the composition stays in the range of about 22° C. plus or minus 7° C., more specifically between about 20° C. plus or minus 5° C. Similarly, the various ternary mixtures shown in Table 8 are measured in this manner and the boiling point remains in the range of about 22° C. plus or minus 7° C.

TABLE 8

| wt % 245fa | wt % E-449 | wt % methanol | Boiling Pt., C. |
|---|---|---|---|
| 95.0 | 5.0 | 0 | 15.4 |
| 93.3 | 4.9 | 1.8 | 15.1 |
| 90.2 | 4.7 | 5.1 | 15.7 |
| 85.3 | 4.5 | 10.2 | 16.3 |
| 76.0 | 4.0 | 20 | 16.6 |
| 66.2 | 3.5 | 30.3 | 16.9 |
| 57.2 | 3.0 | 39.8 | 20.4 |
| 48.2 | 2.5 | 49.3 | 23.2 |
| 38.1 | 2.0 | 59.9 | 22.4 |
| 36.4 | 1.9 | 61.7 | 22.3 |

What is claimed is:

1. Compositions having substantially constant boiling points comprising 1,1,1,3,3-pentafluoropropane, 1,1,1,2,2,3,4,5,5,5-decafluoropentane, and 1,2-trans-dichloroethylene, said compositions having a boiling point of about 22° C.±7° C. at 14.7 psia.

2. A refrigerant composition consisting essentially of a composition according to claim 1.

3. A blowing agent consisting essentially of a composition according to claim 1.

4. A method for producing a foam comprising foaming a composition containing a blowing agent according to claim 3.

5. A closed cell foam composition prepared by foaming a foamable composition containing a blowing agent according to claim 3.

6. A premix comprising a polyol and a blowing agent consisting essentially of a composition according to claim 1.

7. A sprayable composition comprising a material to be sprayed and a propellant consisting essentially of a composition according to claim 1.

8. A composition according to claim 1 comprising from about 25 to about 75 weight percent of 1,1,1,3,3-pentafluoropropane, from about 15 to about 60 weight percent of 1,1,1,2,2,3,4,5,5,5-decafluoropentane, and from about 1 to about 60 weight percent 1,2-trans-dichloroethylene.

9. A composition according to claim 8 having a having a boiling point of about 20° C.±5° C. at 14.7 psia.

10. A composition of claim 8 comprising from about 25 to about 70 weight percent of 1,1,1,3,3-pentafluoropropane, from about 25 to about 50 weight percent of 1,1,1,2,2,3,4,5,5,5-decafluoropentane, and from about 5 to about 50 weight percent 1,2-trans-dichloroethylene, said compositions having a boiling point of about 23° C.±5° C. at 14.7 psia.

11. A composition of claim 10 comprising from about 25 to about 65 weight percent of 1,1,1,3,3-pentafluoropropane, from about 35 to about 45 weight percent of 1,1,1,2,2,3,4,5,5,5-decafluoropentane, and from about 10 to about 40 weight percent 1,2-trans-dichloroethylene.

12. A refrigerant composition consisting essentially of a composition according to claim 8.

13. A blowing agent consisting essentially of a composition according to claim 8.

14. A method for producing a foam comprising foaming a composition containing a blowing agent according to claim 13.

15. A closed cell foam composition prepared by foaming a foamable composition containing a blowing according to claim 13.

16. A premix comprising a polyol and a blowing agent consisting essentially of a composition according to claim 8.

17. A sprayable composition comprising a material to be sprayed and a propellant consisting essentially of a composition according to claim 8.

18. A composition having substantially constant boiling points consisting essentially of 1,1,1,3,3-pentafluoropropane; 1,1,1,2,2,3,4,5,5,5-decafluoropentane; and 1,2-trans-dichloroethylene, said compositions having a boiling point of about 22° C.±7° C. at 14.7 psia.

19. The composition of claim 18 consisting essentially of about 25 to about 75 weight percent of 1,1,1,3,3-pentafluoropropane, from about 15 to about 60 weight percent of 1,1,1,2,2,3,4,5,5,5-decafluoropropentane, and from about 1 to about 60 weight percent 1,2-trans-dichloroethylene.

20. The composition of claim 19 having a having a boiling point of about 20° C.±5° C. at 14.7 psia.

21. The composition of claim 19 consisting essentially of about 25 to about 70 weight percent of 1,1,1,3,3-pentafluoropropane, from about 25 to about 50 weight percent of 1,1,1,2,2,3,4,5,5,5-decafluoropentane, and from about 5 to about 50 weight percent 1,2-trans-dichloroethylene, said compositions having a boiling point of about 23° C.±5° C. at 14.7 psia.

22. A composition of claim 21 consisting essentially of about 25 to about 65 weight percent of 1,1,1,3,3-pentafluoropropane, from about 35 to about 45 weight percent of 1,1,1,2,2,3,4,5,5,5-decafluoropentane, and from about 10 to about 40 weight percent 1,2-trans-dichloroethylene.

* * * * *